US008924087B2

(12) United States Patent
Heberer et al.

(10) Patent No.: US 8,924,087 B2
(45) Date of Patent: Dec. 30, 2014

(54) MOTOR VEHICLE HAVING A CENTRALIZED DOOR LOCKING SYSTEM

(75) Inventors: Andreas Heberer, Mainz (DE); Jeffrey L. Konchan, Romeo, MI (US); Frank J. Arabia, Jr., Macomb, MI (US); Matthias Ruehr, Nackenheim (DE); David T. Proefke, Troy, MI (US); Jeffrey James Hoorn, South Lyon, MI (US); Peter Eduard Schuessler, Hoesbach (DE); Richard J. Lange, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 102 days.

(21) Appl. No.: 13/471,639

(22) Filed: May 15, 2012

(65) Prior Publication Data

US 2013/0311046 A1 Nov. 21, 2013

(51) Int. Cl.
*B60R 22/00* (2006.01)
*E05F 15/00* (2006.01)
*G05D 1/00* (2006.01)

(52) U.S. Cl.
USPC ............................... 701/45; 340/5.72; 70/237

(58) Field of Classification Search
USPC ............. 701/1, 31.4, 31.7, 45, 48, 49, 70, 22; 307/10.1, 10.2, 126, 24, 9.1; 340/5.64, 340/5.72, 540, 426.1, 438; 292/201, 262; 70/237
See application file for complete search history.

(56) References Cited

U.S. PATENT DOCUMENTS

| | | | | |
|---|---|---|---|---|
| 7,425,025 | B2 * | 9/2008 | Barlow, Jr. | 292/262 |
| 7,642,669 | B2 * | 1/2010 | Spurr | 307/9.1 |
| 2004/0026999 | A1 * | 2/2004 | Hirota et al. | 307/10.1 |
| 2006/0108874 | A1 | 5/2006 | Kalb | |
| 2008/0269990 | A1 * | 10/2008 | Ghannam et al. | 701/45 |
| 2010/0007463 | A1 * | 1/2010 | Dingman et al. | 340/5.72 |

FOREIGN PATENT DOCUMENTS

| | | | |
|---|---|---|---|
| DE | 19706393 | A1 | 10/1997 |
| DE | 19928101 | A1 | 1/2001 |
| DE | 102009010509 | A1 | 10/2009 |

OTHER PUBLICATIONS

German Search Report issued May 6, 2014 in DE 10 2013 007 154.2.

* cited by examiner

*Primary Examiner* — Tuan C. To
*Assistant Examiner* — Isaac Smith
(74) *Attorney, Agent, or Firm* — Ingrassia Fisher & Lorenz, P.C.

(57) ABSTRACT

A motor vehicle has a plurality of doors, each secured by a lock, peripheral control units, each connected to one of said locks, for sending a command signal to an actuator of the lock, a central control unit for sending command signals to the actuators of the locks, and an accident detector. If the accident detector has detected an accident, at least one of the actuators is switchable from a central operating mode in which it executes command signals of the central control unit and its associated peripheral control unit into a peripheral operating mode in which it executes only command signals from its peripheral control unit.

9 Claims, 2 Drawing Sheets

MOTOR VEHICLE HAVING A CENTRALIZED DOOR LOCKING SYSTEM

TECHNICAL FIELD

The technical field relates to a motor vehicle having a plurality of doors secured by locks, and a centralized locking system capable of switching the locks between locked and unlocked states.

BACKGROUND

A motor vehicle is known e.g. from DE 10 2009 010 509 A1. The centralized locking system of such a conventional motor vehicle comprises a central control unit that is adapted to receive a remote control signal and to address, in reaction to the remote control signal, peripheral control units of the doors which, in turn, switch the locks of the doors between locked and unlocked states. In the locked state, the door locks do not react upon operation of external handling means installed at an outer side of the doors; from the unlocked state, a door lock can be brought into a released state by operation of its associated external handling means. In the released state the door is freely displaceable between closed and open positions.

In each door of this conventional vehicle, the external handling means and an internal handling means are mechanically connected to the lock. Elements required for transmitting an operating force between one of the handling means and its associated lock must be adapted to the shape of the door and to the placement of the handling means and the lock within the door. Therefore, they must be developed and manufactured specifically for each vehicle model, and, in comparison to parts that can be used for a plurality of vehicle models, they are rather expensive.

The diversity of parts required for different vehicle models makes the logistics of the manufacturing process complicated and laborious. Therefore, it is desirable to use, in the locking system of a motor vehicle, as few model-specific parts as possible. One way to reach this goal is to use an electrically operated locking system. From the technical point of view, it is easy to connect external and internal handling means of a door to an electric switch, the position of which is detected by a central control unit, and to have the central control unit send command signals corresponding to the detected switch position to the door locks. However, there is the problem that if in case of an accident the central control unit, its energy supply or a signal path between the central control unit and a door lock is damaged and one or more locks may operate in less than an optimal manner.

In view of the foregoing, at least one object is therefore to provide a motor vehicle which ensures sufficient operativeness of the doors without requiring a mechanical coupling between handling means and locks of the doors. In addition, other objects, desirable features and characteristics will become apparent from the subsequent summary and detailed description, and the appended claims, taken in conjunction with the accompanying drawings and this background.

SUMMARY

A motor vehicle is provided with a plurality of doors secured by locks, peripheral control units, each of which is connected to one of said locks for sending a command signal to an actuator of said lock, and a central control unit for sending command signals to the actuators of said locks, the vehicle further comprising at least one accident detector, wherein, if the accident detector has detected an accident, at least one of the actuators is adapted to be switched from a central operating mode in which it executes commands signals of the central control unit and of the peripheral control unit associated to it, into a peripheral operational mode in which it executes only command signals of its associated peripheral control unit. Preferably all actuators are thus adapted to be switched between central and peripheral operation modes.

If the actuator has two inputs for receiving command signals from the central control unit and from its associated peripheral control unit, respectively, the switching of the operating mode must occur at the actuator itself, so that it will ignore signals which arrive at the input connected to the central control unit while accepting those from the peripheral control unit. It is simpler if the peripheral control unit is located on a signal path between the central control unit and the actuator and is adapted not to transmit a command signal received from the central control unit while in the peripheral operating mode.

To this effect, the peripheral control unit may comprise a switch controlled by an output signal of the accident detector for interrupting the signal path. A voltaic interruption of the signal path specifically enables to protect the section of the signal path which extends between the peripheral control unit and the lock controlled by it from the effects of a short circuit which may occur due to the accident on a section of the signal path which extends between the central control unit and the peripheral control unit, and thus to maintain operativeness of the signal path between the peripheral control unit and the lock. The peripheral control unit should be connected to an accumulator which is adapted to provide power to the peripheral control unit and/or to its associated actuator if a central power supply of the vehicle, specifically a vehicle battery, should fail due to the accident.

In case of a slight accident in which the locking system of the vehicle is not damaged, it is desirable to be able to maintain complete operativeness of the central control unit. Therefore, the peripheral control unit is preferably adapted, in case of detection of an accident by the accident detector, to verify operativeness of the central control unit and to switch into peripheral operating mode only if a failure of the central control unit is detected.

There a several possibilities to carry out such a verification. One of these is that in case of detection of an accident the peripheral control unit sends a request to the central control unit and verifies whether a reply to this request provided by the central control unit is correct. If the peripheral control unit receives no response or a wrong one, it regards the central control unit as defective and passes into peripheral operating mode.

Alternatively, the central control unit may be adapted, in case of detection of an accident, to output a signal to the peripheral control units of its own motion, and the peripheral control unit passes into to peripheral operating mode if this expected signal is not received within a predetermined time interval after detection of the accident. This predetermined signal may specifically be an unlocking command signal by which the door locks are switched into an unlocked state in which they can be opened from outside.

Since each peripheral control unit decides for itself whether the signal received from the central control unit is correct and/or timely, the result of the decision can vary for different peripheral control units. In particular, if the signal path is damaged only between one of the peripheral control units and the central control unit, only this peripheral control unit will switch into peripheral operating mode, whereas the other peripheral control units continue in central operating mode.

In order to minimize the risk of the signal path between a peripheral control unit and its associated lock being damaged in an accident, preferably each peripheral control unit is located within the door, the lock of which it is connected to. If under these circumstances the peripheral control unit or the signal path between it and the door lock is damaged by the accident, the probability is high that the door will not be free to be opened anyway, because it is deformed by the accident or because it is blocked by an object with which the vehicle has collided.

An external handling device at an outer side of one of the doors and/or an internal handling device at an inner side of the door can be mechanically coupled to a switch belonging to the peripheral control unit of said door. Since there are no serious constraints on the placement of the switch at the door, parts which couple the handling device and the switch do not have to be specific for a vehicle model and can therefore be manufactured in high numbers at low costs.

In order to ensure that the doors of the vehicle can still be opened even if, e.g., after a long period of non-use, all electric power storage of the vehicle are empty, an auxiliary handling device at the inner side of the door should be mechanically coupled to the lock. Such an auxiliary handling device does not have to be exposed at the inner side of the door. In order to prevent it from being operated by an intruder, e.g. after smashing a window pane, it should rather be hidden, preferably at a location which is made accessible by means of specific tools only.

The accident detector used within the context of this invention may be an accident detector which is conventionally used for triggering a personal security system such as an air bag or an active hood, e.g. an acceleration sensor. It is also conceivable to associate to each peripheral control unit an accident detector of its own, which is independent from an accident detector controlling the personal security system.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
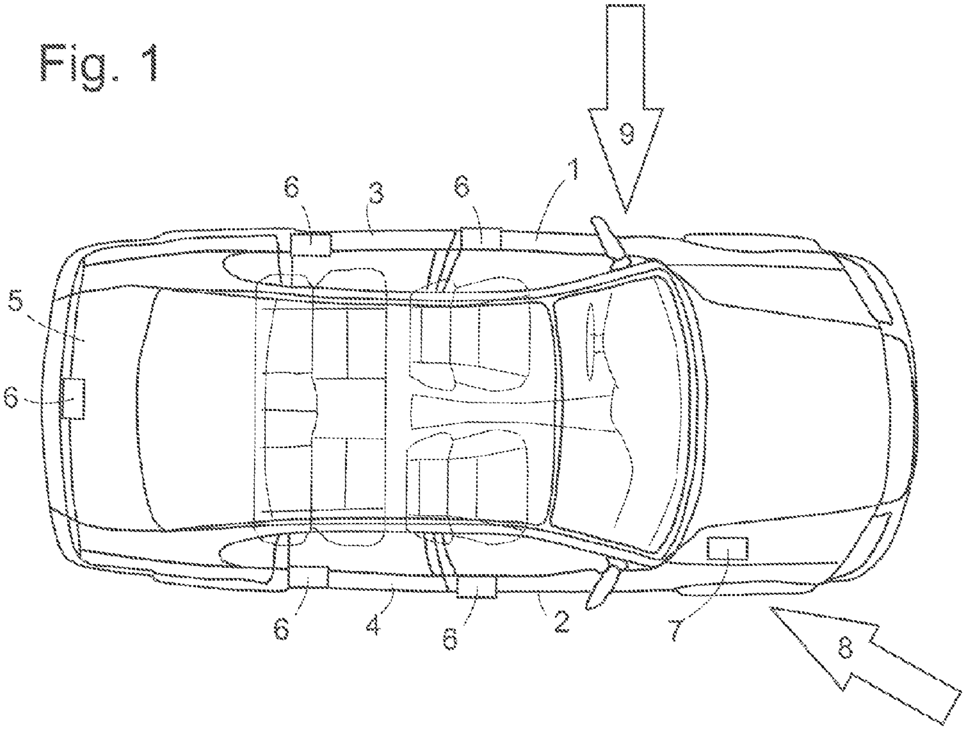
FIG. 1 is a schematic top view of a vehicle according to an embodiment.

A motor vehicle shown in FIG. 1 has a passenger compartment which is accessible by front and rear doors 1 to 4, and a luggage bay which is accessible by a luggage bay lid which, in the context of the present invention, is regarded as another door 5. Locking systems 6 of doors 5 are schematically represented in the Fig. as rectangles, the inner structure of which will be explained later referring to FIG. 2 and FIG. 3. Locking systems 6 are connected by signal lines, not shown in FIG. 1, to a central control unit 7 which can be located within the vehicle wherever convenient. The central control unit 7 comprises a conventional radio interface for receiving radio signals from a transponder key operated by a user and is adapted to switch the locking systems 6 between locked and unlocked states upon receipt of a corresponding radio signal. Further, the central control unit 7 may be connected to a locking cylinder which may specifically be part of the locking system 6 of driver door 1, so as to detect the operation of the locking cylinder by a mechanical key inserted in it and to switch the locking systems 6 of the doors jointly between locked and unlocked states according to this operation.

Further, at each door 1 to 5 or at least one of them, a switch may be provided which is operated by hand from outside and the operation of which causes the central control unit 7 to verify, using the radio interface, whether a fitting transponder key is in the vicinity of the operated switch, and, if yes, to switch the locking systems 6 between the locked and unlocked states. If the vehicle is involved in an accident, communication between the central control unit 7 and the locking systems 6 may be disturbed, be it because, due to an impact from the direction of arrow 8, the control unit 7 is damaged or because a signal line between the central control unit 7 and the locking systems 6 is intercepted, short-circuited or otherwise damaged. Such damage can occur in particular if the vehicle is hit from the direction of arrow 9 in the vicinity of the hinge of one of doors 1 to 4, since the signal line will generally penetrate into the door, in case of FIG. 1 into driver door 1, in the vicinity of its hinge.

Figure 2:
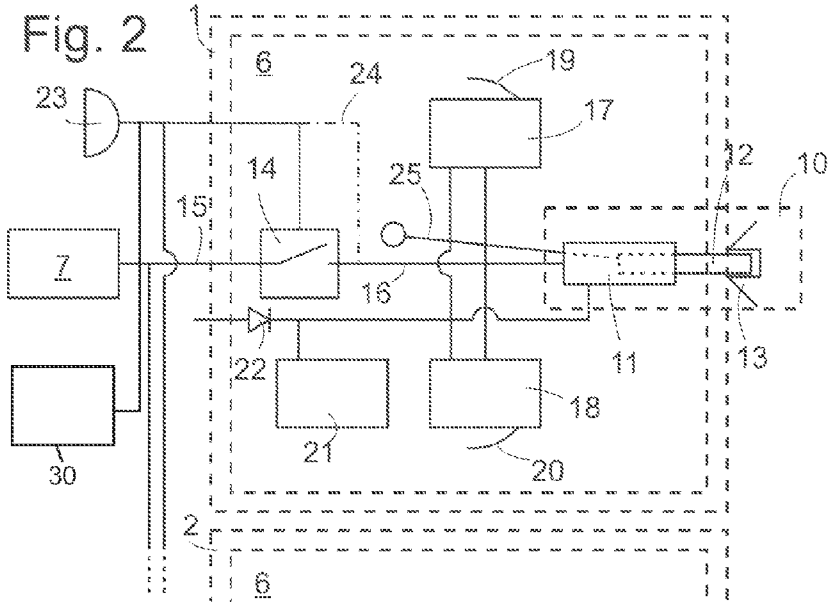
FIG. 2 is a block diagram of a locking system according to a first embodiment.

For an understanding of the operation of the locking systems 6 in case of such an incident, it is appropriate first to study their internal structure. FIG. 2 shows in detail the components of the locking system 6 of door 1; locking systems of the other doors 2, 3, 4, 5 have the same structure. A lock 10 comprises two members which are displaceable with respect to each other by means of an electric actuator 11, referred to here as a door member 12 and a body member 13, which are capable of lockingly engaging in order to fix the door 1 in closed position and which can be disengaged from each other in order to enable opening of the door 1. The actuator 11 is connected to the central control unit 7 by a signal line which is divided into a central section 15 and a door section 16 by a switch 14. The door section 16 of the signal line has two switches 17, 18 connected to it, which, in turn, are coupled to an external handling device 19 such as a door handle, and to an internal handling device 20, respectively. An operation of the internal handling device 20 by a vehicle occupant causes an unlocking signal to be output to door section 16 by switch 18. The unlocking signal causes lock 10, if in its locked state, to switch into the unlocked state. The lock members 12, 13 are in locking engagement both in the locked and unlocked states, the difference between the two states being that only in the unlocked state a lock 10 will react to a release signal by the actuator 11 disengaging lock members 12, 13 and thus placing the door 1 in a released state in which it is free to pivot between an open position and a closed position. The release signal can be generated by switch 18 if the internal handling device 20 is displaced beyond the position in which it generates the unlocking signal, or it can be generated by switch 17 if the external handling device 19 is operated.

The unlocking signal is not generated by switch 17, so that the door cannot be opened illicitly from outside when in the locked state. It can be provided, however, that switch 17 generates an activation signal instead, which is received by central control unit 7 and causes the latter to verify whether a transponder key fitting the vehicle is in the vicinity and, if yes, to transmit the unlocking signal.

The switches 17, 18 receive the electric power needed for generating the various signals from an accumulator 21, specifically a super capacitor, which is mounted in the door, forming part of its locking system 6, and is connected to a vehicle battery, located outside the door and not shown in FIG. 2, by an electric valve 22. The electric valve 22 ensures that the accumulator 21 is always charged while the vehicle battery is operating, and it prevents the accumulator 21 from discharging via a short-circuit that may be caused on an outside of the door by an accident. For transmitting the various signals mentioned above, the signal line may comprise various conductors associated to the signals. Alternatively, it may be structured as a bus where the various signals circulate in the form of digital information packets.

The switch 14 is coupled to an acceleration sensor 23 which responds to a sudden deceleration of the vehicle in case of an accident by triggering, in a known manner, a personal protection system 30 (FIG. 2), such as an airbag, an active hood or the like. The same signal which causes the personal protection system 30 to trigger is received by switch 14 and causes it to open. When switch 14 is open, a short-circuit which may be caused by the accident in the central section 15 can no longer prevent signal communication between the switches 17, 18 and the actuator 11, so that even in case of a failure of the central control unit 7 or of central line section 15, opening the door remains possible.

As indicated by a dash-dot line 24, the acceleration sensor 23 may be coupled directly to the door section 16 of the signal line, in particular with a conductor thereof that carries the unlocking signal, so that the signal from acceleration sensor 23 which causes switch 14 to open can at the same time have the effect of an unlocking signal on actuator 11. If the signal line is organized as a bus, line 24 can be replaced by a digital signal source which is controlled by acceleration sensor 23 to output the digital unlocking signal to line section 16 in case of an accident.

A Bowden cable connected to the door member 12 of lock 10 has the reference numeral 25 assigned to it. A handle of Bowden cable 25 is hidden within the door and can be made accessible by removing a liner at the inner side of the door. By pulling the Bowden cable 25 lock 10 can be brought into released state even if, e.g. due to a long rest period both the battery of the vehicle and the accumulator 21 are discharged.

Figure 3:
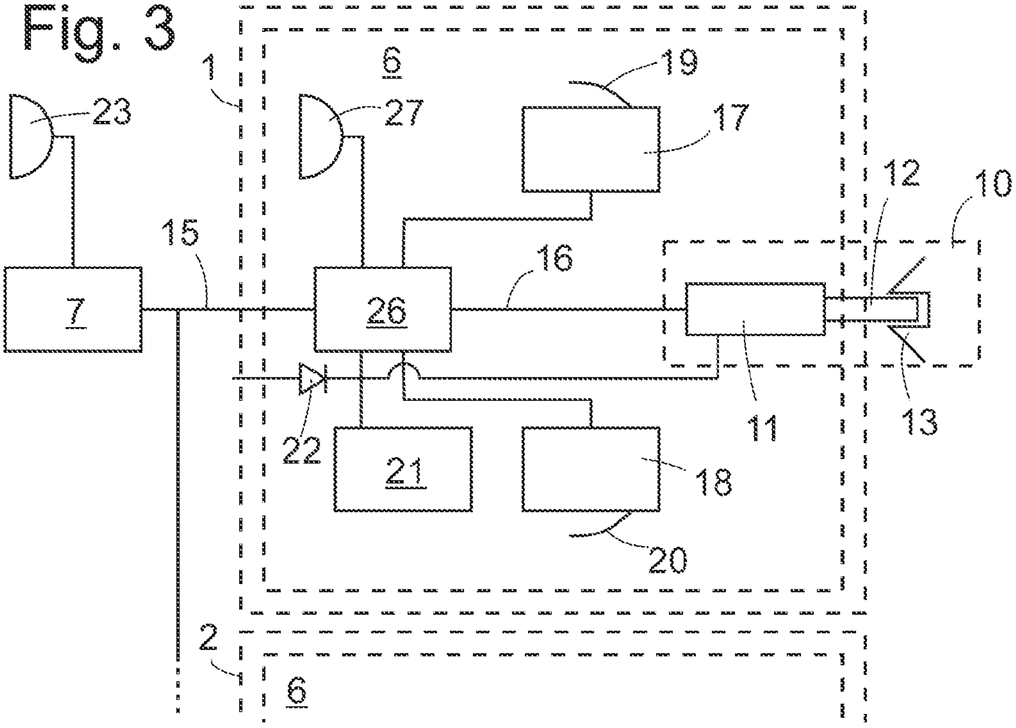
FIG. 3 is a block diagram of a locking system according to a second embodiment.

FIG. 3 illustrates a second embodiment of the locking system 6. While in the embodiment of FIG. 2 a peripheral control unit that controls actuator 11 in case of a failure of central control unit 7 is substantially made up of switches 14, 17, 18, in the embodiment of FIG. 3 such a peripheral control unit 26 is formed by a digital circuit. In normal operation this peripheral control unit 26 forwards locking and unlocking signals received from the central control unit 7 to the actuator 11 without modifying them, monitors the position of switches 17, 18 and, if necessary, generates locking, unlocking or releases signals of its own if the switches 17, 18 are in a position corresponding thereto.

The peripheral control units 26 of doors 1 to 5 can be connected to the same acceleration sensor 23 as shown in FIG. 2, which in case of an accident triggers the personal security systems. Alternatively, and as shown in FIG. 3, each door 1 to 5 may have an acceleration or shock sensor 27 of its own which responds to the collision or to the shock caused by the blast of an airbag triggered by sensor 23. The risk of an interruption of the signal path between sensor 27 and peripheral control unit 26 is minimized by the sensor 27 being installed in the same door as the peripheral control unit 26 to which it is connected.

If the acceleration sensor 23 detects an accident and the central control unit 7 is still operative, it reacts by transmitting an unlocking signal. If the central line section 15 is also undamaged the signal is received by the peripheral control units 26 of all doors 1 to 5. All peripheral control units 26 that receive the unlocking signal thus recognize that the central control unit 7 is still operational after the accident, and they continue to forward signals from the central control unit 7 to the actuators 11 controlled by them. However, if one of the peripheral control units 26, e.g. in door 1, receives no unlocking signal from central control unit 7 while at the same time sensor 27 indicates an accident, peripheral control unit 26 detects a failure. By having this peripheral control unit 26 ignore signals that subsequently arrive from central line section 15, operability of the peripheral control unit 26 is ensured in spite of the accident. Control unit 26 then autonomously and automatically transmits the unlocking signal to the actuator 11 of door 1, so that door 1 can be opened from inside and outside.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
a plurality of doors;
a plurality of locks that are configured to secure the plurality of doors;
at least one personal protection system separate from the plurality of locks;
a plurality of actuators, each of the plurality of actuators associated with one of the plurality of locks;
a plurality of peripheral control units that are each connected to one lock of the plurality of locks and configured to send a command signal to the one of the plurality of actuators associated with the lock, each of the plurality of peripheral control units including a switch;
a central control unit that is configured to send command signals to the plurality of actuators;
an acceleration sensor that is configured to detect an accident and generates a signal, the acceleration sensor communicatively coupled to the switch to receive the signal and the switch opens based on the receipt of the signal; and
wherein at least one of the plurality of actuators is switchable from a central operating mode in which the at least one of the plurality of actuators executes command signals of the respective one of the plurality of peripheral control units and of the central control unit into a peripheral operating mode in which the at least one of the plurality of actuators executes only the command signals from the associated one of the plurality of peripheral control units based on the receipt of the signal, and the signal from the acceleration sensor activates the at least one personal protection system.

2. The motor vehicle of claim 1, wherein at least one of the peripheral control units is located on a signal path between the central control unit and a first actuator of the plurality actuators and is configured not to forward a signal received from the central control unit to the first actuator while in the peripheral operating mode.

3. The motor vehicle of claim 1, wherein each peripheral control unit of the plurality of control units is connected to an accumulator that is adapted to provide power to the peripheral control unit and an associated actuator.

4. The motor vehicle according to claim 1, wherein each of the plurality of peripheral control units is configured to verify an operability of the central control unit and to switch into the peripheral operating mode only if a failure of the central control unit is detected in case of detection of the accident by the acceleration sensor.

5. The motor vehicle according to claim 1, wherein each of the plurality of peripheral control units is located within one door of the plurality of doors and each of the plurality of peripheral control units is connected to the lock associated with the one door.

6. The motor vehicle according to claim 1, wherein an external handling device at an outer side of one of the plurality of doors is mechanically coupled to the switch of one of the plurality of peripheral control units of said one of the plurality of doors.

7. The motor vehicle according to claim 1, wherein an internal handling device at an inner side of an at least one door of the plurality of doors is mechanically coupled to the switch of the peripheral control unit of said at least one door.

8. The motor vehicle according to claim 1, wherein an auxiliary handling device is accessible at an inner side of at least one door of the plurality of doors that is mechanically coupled to at least one lock of the plurality of locks.

9. The motor vehicle according to claim 1, further comprising a plurality of acceleration sensors, each of which is connected to a respective one of the peripheral control units and each of the plurality of acceleration sensors is located within a respective one of the plurality of doors.

* * * * *